US011393320B2

(12) United States Patent
Stenneth et al.

(10) Patent No.: US 11,393,320 B2
(45) Date of Patent: Jul. 19, 2022

(54) METHOD AND APPARATUS FOR VERIFYING REDUCED VISIBILITY EVENT WARNINGS

(71) Applicant: HERE Global B.V., Eindhoven (NL)

(72) Inventors: Leon Stenneth, Chicago, IL (US); Advait Raut, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/087,826

(22) Filed: Nov. 3, 2020

(65) Prior Publication Data
US 2022/0139192 A1    May 5, 2022

(51) Int. Cl.
*G08B 21/10* (2006.01)
*G01W 1/10* (2006.01)
(Continued)

(52) U.S. Cl.
CPC .............. *G08B 21/10* (2013.01); *G01W 1/06* (2013.01); *G01W 1/10* (2013.01); *G08B 27/006* (2013.01);
(Continued)

(58) Field of Classification Search
CPC ....... G08B 21/10; G08B 27/006; G01W 1/10; G01W 1/06; G01W 2001/006;
(Continued)

(56) References Cited

U.S. PATENT DOCUMENTS 9,360,556 B2    6/2016  Zhu et al.
9,401,089 B2    7/2016  Drobot et al.
(Continued)

FOREIGN PATENT DOCUMENTS

DE    102018210885 A1        1/2020
EP         3367137 A2  *    8/2018    ........... G08G 5/0047
KR     20150138370 A   *   12/2015    ......... G01C 21/3691

OTHER PUBLICATIONS

Hautiere, Nicolas et al., *Sensing the Visibility Range at Low Cost in the Safespot Roadside Unit*, Universite Paris-Est., LEPSiS, LCPC-INRETS, France (8 pages) ResearchGate, Sep. 2009.
(Continued)

*Primary Examiner* — Daniel R Miller
*Assistant Examiner* — Christian T Bryant
(74) *Attorney, Agent, or Firm* — Alston & Bird LLP

(57) ABSTRACT

A method, apparatus and computer program product for determining a reduced visibility event warning are described herein. In the context of a method, a location corresponding with a reduced visibility event warning may be identified. Information regarding visibility at one or more stationary positions based upon the location of the reduced visibility event warning may be received from one or more remote devices (e.g., sensing apparatuses). The method may determine a reduced visibility event warning confidence for the location corresponding with a reduced visibility event warning based upon the information regarding visibility. The method may cause the reduced visibility event warning to be published in an instance in which the reduced visibility event warning confidence satisfies a confidence threshold.

20 Claims, 6 Drawing Sheets

(51) Int. Cl.
*G01W 1/06* (2006.01)
*G01W 1/00* (2006.01)
*H04H 60/00* (2009.01)
*G01W 1/18* (2006.01)
*G08B 27/00* (2006.01)

(52) U.S. Cl.
CPC ........ *G01W 1/18* (2013.01); *G01W 2001/006* (2013.01); *G01W 2201/00* (2013.01); *G01W 2203/00* (2013.01); *H04H 60/00* (2013.01)

(58) Field of Classification Search
CPC ......... G01W 2203/00; G01W 2201/00; G01W 1/18; H04H 60/00
See application file for complete search history.

(56) References Cited

U.S. PATENT DOCUMENTS

| | | | |
|---|---|---|---|
| 9,933,548 B1* | 4/2018 | Stenneth | G08B 27/006 |
| 10,362,468 B2* | 7/2019 | Phillips | H04M 3/005 |
| 2018/0113882 A1* | 4/2018 | Stenneth | G06F 16/29 |
| 2019/0049256 A1 | 2/2019 | Camp et al. | |
| 2019/0271563 A1* | 9/2019 | Pandit | G01C 21/20 |
| 2019/0340940 A1 | 11/2019 | Elkabetz et al. | |

OTHER PUBLICATIONS

Pagani et al., *Deep Neural Network Approach for Automatic Fog Detection Using Traffic Camera Images*, Royal Netherlands Meteorological Institute, Apr. 2018.

* cited by examiner

METHOD AND APPARATUS FOR VERIFYING REDUCED VISIBILITY EVENT WARNINGS

TECHNOLOGICAL FIELD

Example embodiments relate generally to a method, apparatus and computer program product for determining a reduced visibility event warning confidence for a location and for publishing or deactivating a corresponding reduced visibility event warning based on the reduced visibility event warning confidence.

BACKGROUND

Reduced visibility event warnings may be generated based on vehicle sensor data that satisfies certain conditions. For example, a combination of particular vehicle speeds and activation of vehicle lights (e.g., rear fog lights, low beam lights and/or the like) can trigger generation of a reduced visibility event warning. Such reduced visibility event warnings may subsequently be published (e.g., transmitted for display in conjunction with a mapping or navigation system).

There is significant variation in the precision and accuracy of reduced visibility event warnings generated based on vehicle sensor data in different geographical regions (e.g., countries, states, cities and/or the like). For example, some geographical regions may mandate activation of certain vehicle lights and/or impose a low speed limit in response to reduced visibility conditions while other geographical regions may not. Thus, vehicle sensor data originating from geographical regions without mandatory driving rules and consistent driver behavior in response to reduced visibility conditions may cause the generation of reduced visibility event warnings to be inaccurate, such as by causing the generation of false positive reduced visibility event warnings. This inaccuracy may lead to drivers placing less confidence in such reduced visibility event warnings, thereby potentially devaluing these warnings.

BRIEF SUMMARY

A method, apparatus and computer program product are provided for determining a reduced visibility event warning confidence, and causing publication of a reduced visibility event warning based at least in part on the reduced visibility event warning confidence. By causing publication of the reduced visibility event warning based on the reduced visibility event warning confidence, publication of false positive reduced visibility event warnings can be suppressed. As a result, the likelihood that the reduced visibility event warnings that are published accurately identify a reduced visibility event is increased, thereby giving drivers greater confidence in such warnings.

In an example embodiment, a computer-implemented method for determining a confidence associated with a reduced visibility event warning is provided. The method comprises receiving an indication of the reduced visibility event warning. The method comprises identifying a location corresponding with the reduced visibility event warning. The method comprises obtaining information regarding visibility at one or more stationary positions based upon the location of the reduced visibility event warning. The method also comprises determining a reduced visibility event warning confidence based at least in part on the information regarding visibility at the one or more stationary positions and causing the reduced visibility event warning to be published based at least in part on the visibility event warning confidence.

Obtaining information regarding visibility may comprise obtaining information from one or more weather stations. The one or more weather stations may be positioned within a region that includes the location. Alternatively, the one or more weather stations may be positioned outside a region that includes the location and the method may comprise determining the visibility within the region based on the information provided by the one or more weather stations outside the region. Obtaining information regarding visibility may additionally or alternatively comprise obtaining one or more images from one or more image sensors within a region that includes the location. Causing the reduced visibility event warning to be published may comprise causing the reduced visibility event warning to be transmitted for display in conjunction with a mapping or navigation system. The method may further comprise causing deactivation of the reduced visibility event warning in an instance in which the reduced visibility event warning confidence fails to satisfy a confidence threshold.

In another example embodiment, an apparatus may be configured to determine a confidence associated with a reduced visibility event warning. The apparatus may comprise processing circuitry and at least one memory including computer program code instructions with the computer program code instructions configured to, when executed by the processing circuitry, cause the apparatus to receive an indication of the reduced visibility event warning. The computer program code instructions are also configured to cause the apparatus to identify a location corresponding with the reduced visibility event warning. The computer program code instructions are also configured to obtain information regarding visibility at one or more stationary positions based upon the location of the reduced visibility event warning. The computer program code instructions are also configured to cause the apparatus to determine a reduced visibility event warning confidence based at least in part on the information regarding visibility at the one or more stationary positions and cause the reduced visibility event warning to be published based at least in part on the visibility event warning confidence.

The computer program code instructions may also be configured to cause the apparatus to obtain information regarding visibility by obtaining information from one or more weather stations. The one or more weather stations may be positioned within a region that includes the location. The one or more weather stations may alternatively be positioned outside a region that includes the location and the computer program code instructions may also be configured to cause the apparatus to determine the visibility within the region based on the information provided by the one or more weather stations outside the region. Obtaining information regarding visibility may comprise obtaining one or more images from one or more image sensors within a region that includes the location. Causing the reduced visibility event warning to be published may comprise causing the reduced visibility event warning to be transmitted for display in conjunction with a mapping or navigation system. The computer program code instructions may also be configured to cause deactivation of the reduced visibility event warning in an instance in which the reduced visibility event warning confidence fails to satisfy a confidence threshold.

In a further example embodiment, a computer program product may be configured to determine a confidence associated with a reduced visibility event warning. The computer program product may comprise at least one non-transitory computer readable storage medium having computer-executable program code instructions stored therein with the computer-executable program code instructions including program code instructions configured, upon execution, to receive an indication of the reduced visibility event warning. The program code instructions are also configured, upon execution, to identify a location corresponding with the reduced visibility event warning and to obtain information regarding visibility at one or more stationary positions based upon the location of the reduced visibility event warning. The program code instructions are also configured, upon execution, to determine a reduced visibility event warning confidence based at least in part on the information regarding visibility at the one or more stationary positions and cause the reduced visibility event warning to be published based at least in part on the visibility event warning confidence.

The program code instructions of an example embodiment are also configured, upon execution, to obtain information regarding visibility by obtaining information from one or more weather stations. The one or more weather stations may be positioned within a region that includes the location. Alternatively, the one or more weather stations may be positioned outside a region that includes the location and the program code instructions may also be configured, upon execution, to determine the visibility within the region based on the information provided by the one or more weather stations outside the region. Obtaining information regarding visibility may comprise obtaining one or more images from one or more image sensors within a region that includes the location. Causing the reduced visibility event warning to be published may comprise causing the reduced visibility event warning to be transmitted for display in conjunction with a mapping or navigation system. The program code instructions may also be configured, upon execution, to cause deactivation of the reduced visibility event warning in an instance in which the reduced visibility event warning confidence fails to satisfy a confidence threshold.

In yet another example embodiment, an apparatus for determining a confidence associated with a reduced visibility event warning is provided. The apparatus comprises means for receiving an indication of the reduced visibility event warning. The apparatus also comprises means for identifying a location corresponding with the reduced visibility event warning. The apparatus further means for comprises obtaining information regarding visibility at one or more stationary positions based upon the location of the reduced visibility event warning. The apparatus also comprises means for determining a reduced visibility event warning confidence based at least in part on the information regarding visibility at the one or more stationary positions and means for causing the reduced visibility event warning to be published based at least in part on the visibility event warning confidence.

The means for obtaining information regarding visibility may comprise means for obtaining information from one or more weather stations. The one or more weather stations may be positioned within a region that includes the location. Alternatively, the one or more weather stations may be positioned outside a region that includes the location and the apparatus may comprise means for determining the visibility within the region based on the information provided by the one or more weather stations outside the region. The means for obtaining information regarding visibility may additionally or alternatively comprise means for obtaining one or more images from one or more image sensors within a region that includes the location. The means for causing the reduced visibility event warning to be published may comprise means for causing the reduced visibility event warning to be transmitted for display in conjunction with a mapping or navigation system. The apparatus may further comprise means for causing deactivation of the reduced visibility event warning in an instance in which the reduced visibility event warning confidence fails to satisfy a confidence threshold.

BRIEF DESCRIPTION OF THE DRAWINGS

Figure 1:
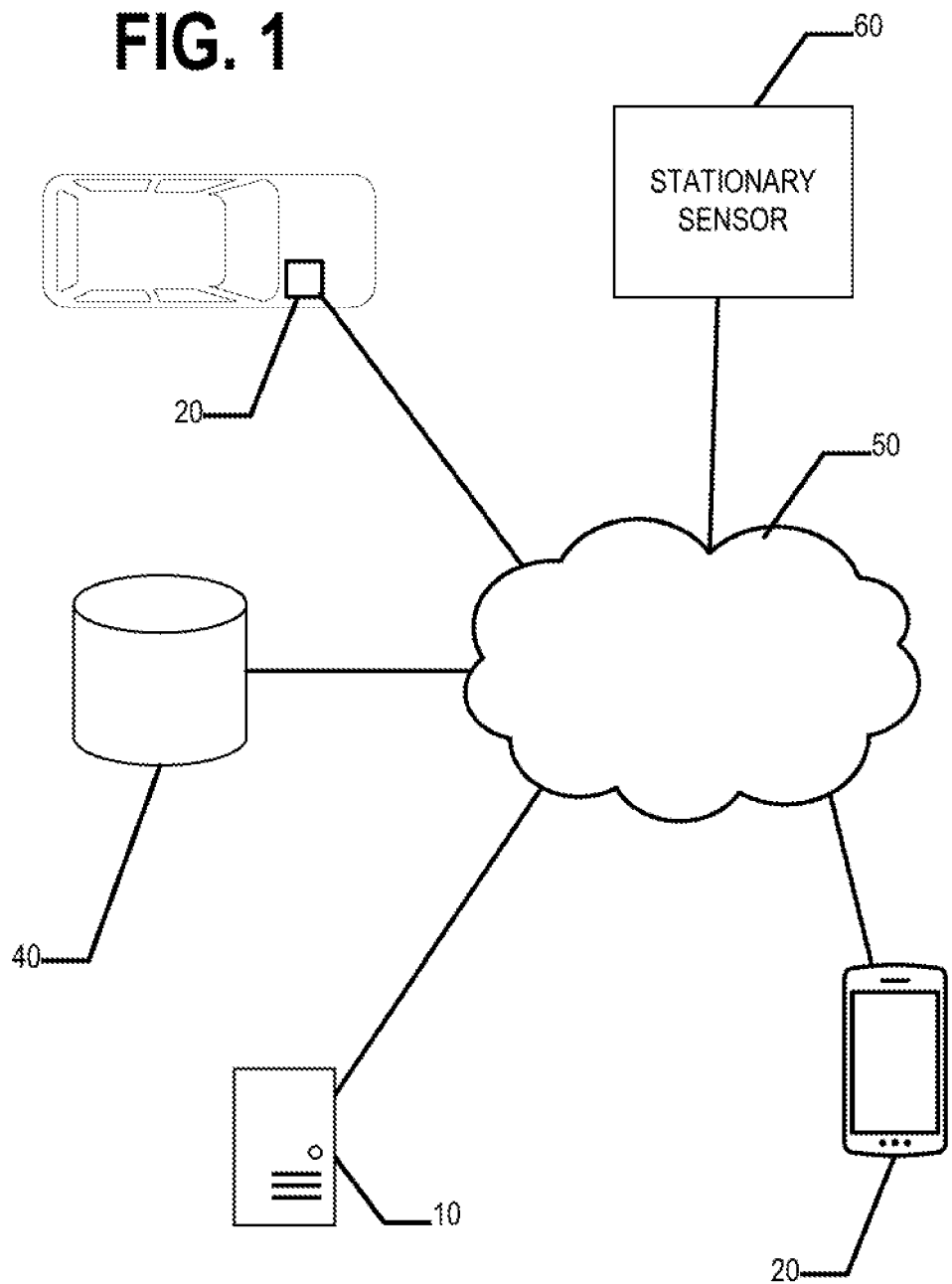
Figure 2A:
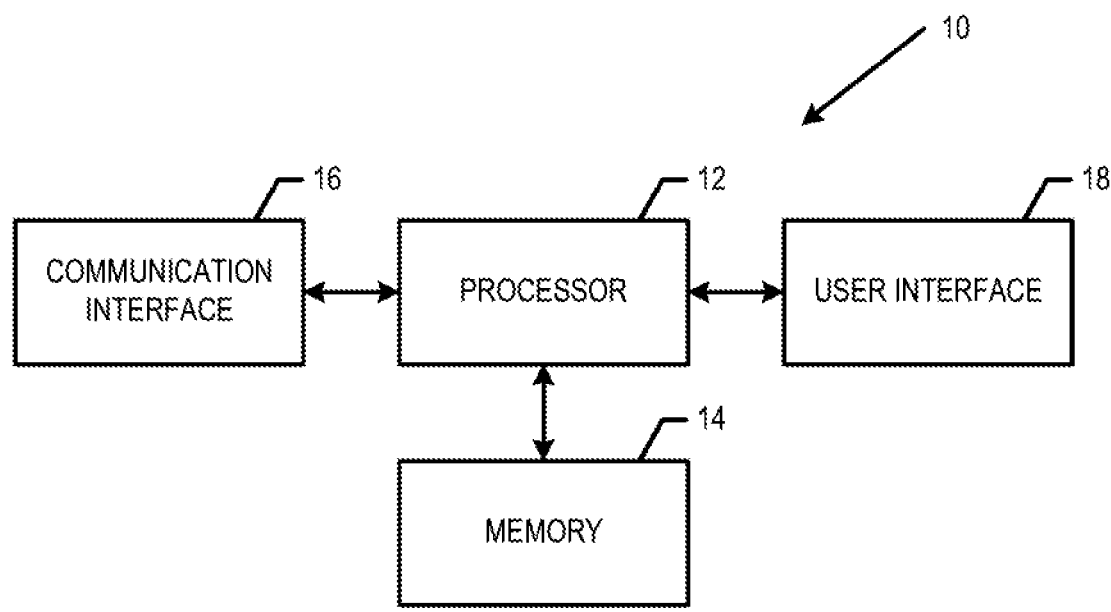
Figure 2B:
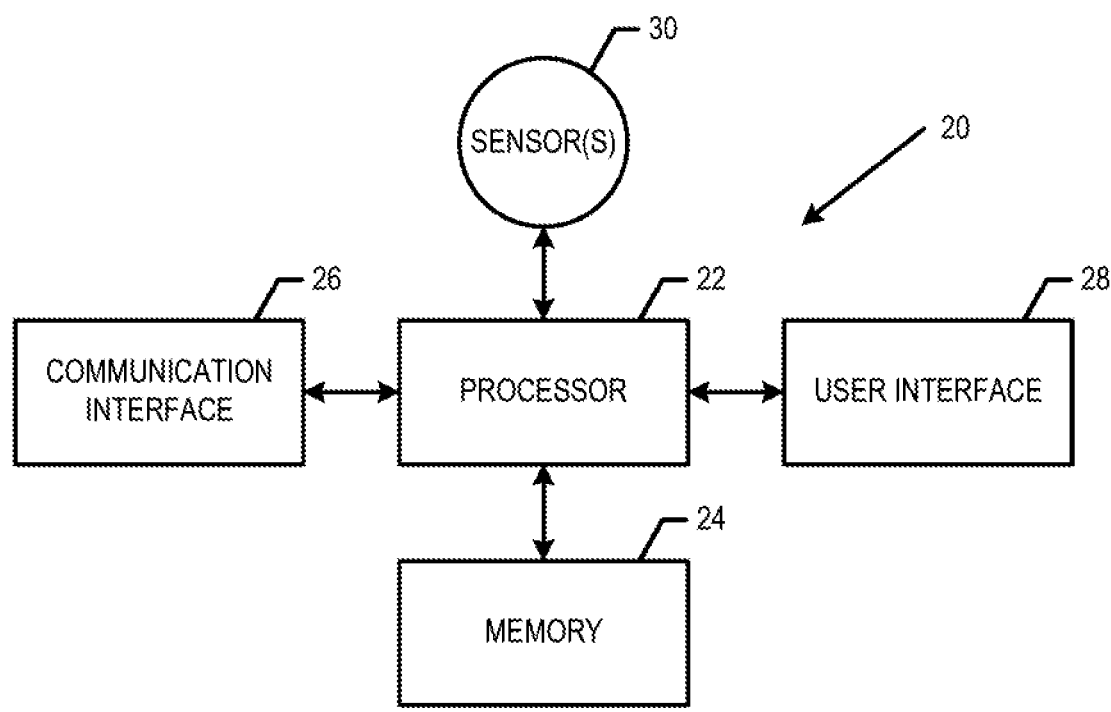
Figure 3:
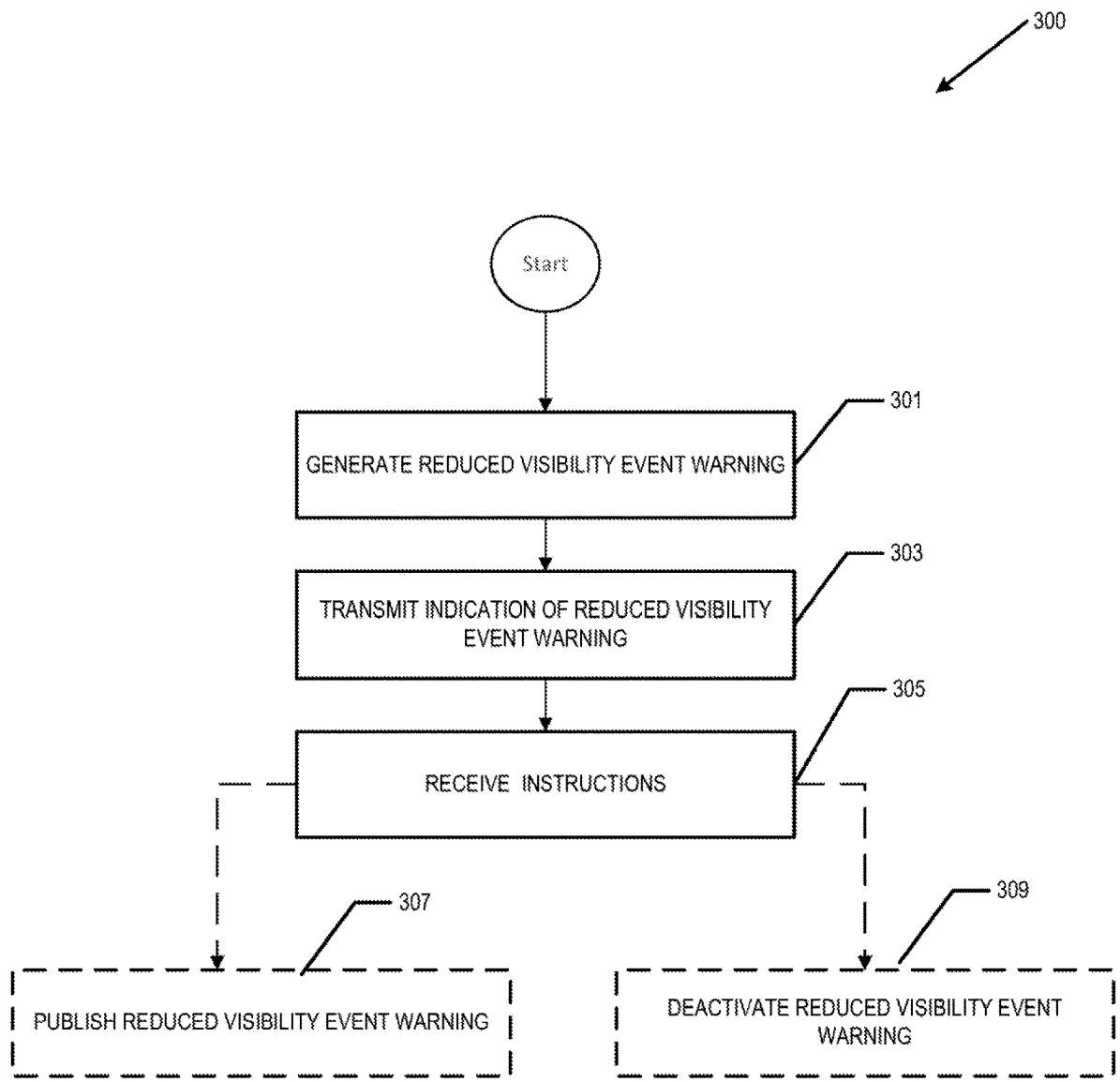
Figure 4:
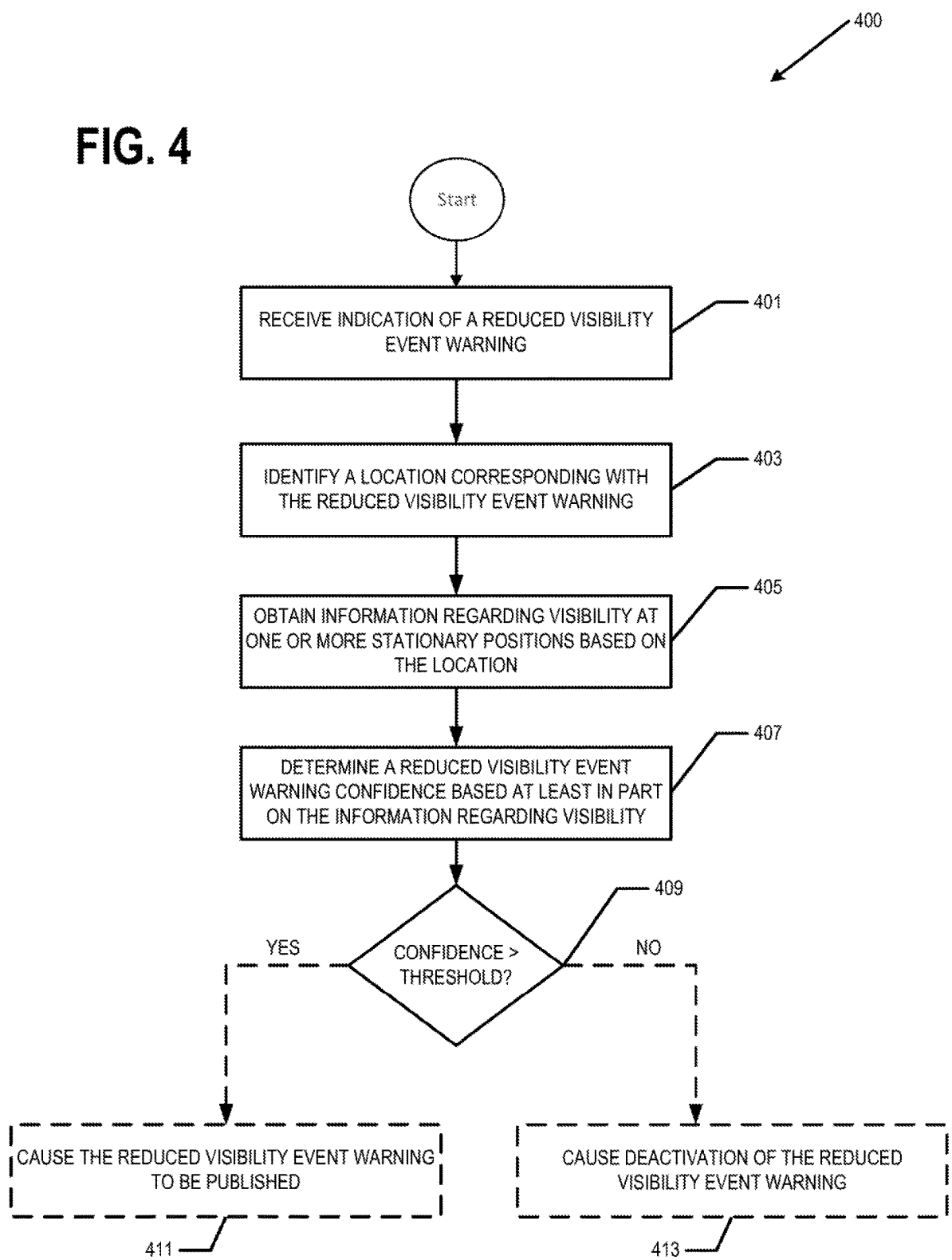
Figure 5:
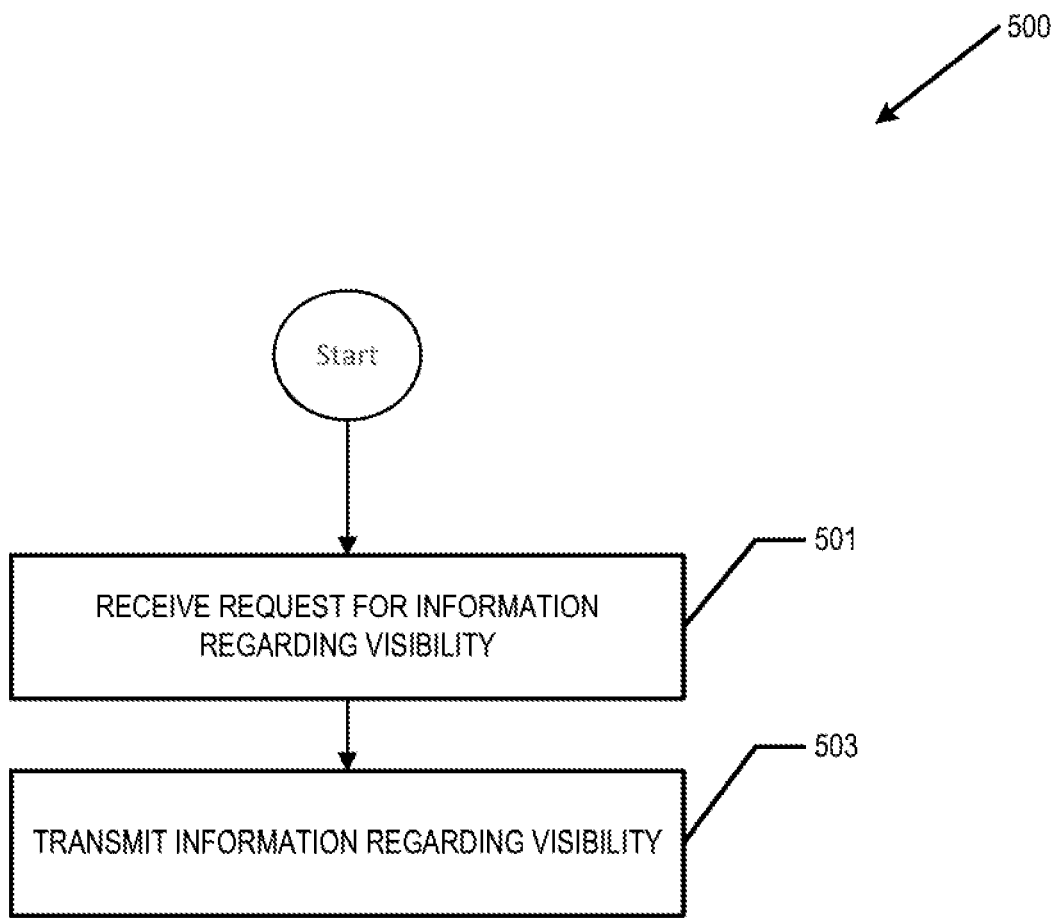

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a computing entity that may be specifically configured in accordance with an example embodiment;

FIG. 2B is a block diagram of an apparatus, such as a vehicle apparatus or a sensing apparatus, that may be specifically configured in accordance with an example embodiment;

FIG. 3 is a flowchart illustrating operations performed, such as by the vehicle apparatus of FIG. 2B, in accordance with an example embodiment;

FIG. 4 is a flowchart illustrating operations performed, such as by the computing entity of FIG. 2A, in accordance with an example embodiment; and FIG. 5 is a flowchart illustrating operations performed, such as by the sensing apparatus of FIG. 2B, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

A method, apparatus and computer program product for determining a reduced visibility event warning confidence for a location and further, for publishing or deactivating a corresponding reduced visibility event warning are described herein. Though many of the embodiments are described in the context of a reduced visibility event warning (e.g., rain, fog and/or the like), the method, apparatus and computer program product may be utilized to determine an event warning confidence for other road conditions such as flood, slippery roads, accidents, disabled vehicles and the like.

FIG. 1 provides an illustration of an example system that can be used in conjunction with various embodiments of the present invention. As shown in FIG. 1, the system may include one or more vehicle apparatuses 20, one or more computing entities 10 (e.g., servers), one or more sensing apparatuses 60, one or more networks 50, and/or the like. In various embodiments, the vehicle apparatus 20 may be an in-vehicle navigation system, vehicle control system, a mobile computing device, and/or the like. For example, a vehicle apparatus 20 may be an in-vehicle navigation system mounted within and/or on-board a vehicle such as a motor vehicle, e.g., automobile, car, scooter, truck, van, bus, motorcycle, bicycle, Segway, golf cart, and/or the like, a non-motor vehicle, etc. In other embodiments, the vehicle apparatus 20 may be a smartphone, tablet, personal digital assistant (PDA), and/or other mobile computing device. In various embodiments, the one or more sensing apparatuses 60 may be or comprise one or more weather stations configured to detect visibility information (e.g., environmental conditions) at a location. In some embodiments, the one or more sensing apparatuses 60 may be or comprise one or more image sensors configured to capture images of environmental conditions at a location.

In example embodiments, a computing entity 10 may be in communication with the vehicle apparatus 20 and sensing apparatus 60 and may comprise components similar to those shown in FIG. 2A, while the vehicle apparatus 20 and sensing apparatus 60 may comprise components similar to those shown in FIG. 2B. In various embodiments, the computing entity 10 may be located remotely from the vehicle apparatus 20, while in other embodiments, the computing entity and the vehicle apparatus may be collocated, such as within a vehicle. Each of the components of the system, including one or more vehicle apparatuses 20, one or more sensing apparatuses 60 and one or more computing entities 10, may be in communication with one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition radio (HD) or other digital radio system, and/or the like. For example, a vehicle apparatus 20 or sensing apparatus 60 may be in communication with a computing entity 10 via the network 50 and/or via the Cloud.

As shown in FIG. 2A, the computing entity 10 may comprise a processor 12, memory 14, and optionally a user interface 18, a communications interface 16, and/or other components configured to perform various operations, procedures, functions or the like described herein. Similarly, as shown in FIG. 2B, the vehicle apparatus 20 and the sensing apparatus 60 may each comprise a processor 22, memory 24, a communications interface 26, a user interface 28, one or more sensors 30 (e.g., a location sensor such as a global positioning system (GPS) sensor; camera(s); two dimensional (2D) and/or three dimensional (3D) light detection and ranging (LiDAR) sensor(s); long, medium, and/or short range radio detection and ranging (RADAR) sensor(s); ultrasonic sensors; electromagnetic sensors; (near-) infrared (IR) cameras, 3D cameras, 360° cameras, accelerometer(s), gyroscope(s), and/or other sensors), and/or other components configured to perform various operations, procedures, functions or the like described herein. With respect to a vehicle apparatus 20, the sensors help to determine one or more features of the corresponding vehicle's surroundings, while with the sensing apparatus 60, the sensors enable the determination of visibility information at a location. Similarly, example embodiments of the vehicle apparatus 20, sensing apparatus 60 and the computing entity 10 are described in more detail below with respect to FIGS. 2A and 2B.

II. Example Operations

In example embodiments, one or more sensors 30 associated with and/or in communication with a vehicle apparatus 20 may gather, capture, record, and/or measure sensor information/data. The vehicle apparatus 20 may generate a reduced visibility event warning based on the sensor information/data. The computing entity 10 may receive one or more indications of reduced visibility event warnings from one or more vehicle apparatuses 20. The computing entity 10 may identify a location corresponding with the reduced visibility event warning. Identifying the location may comprising determining a region that includes the location from one or more databases 40. The computing entity 10 may obtain (e.g., request) information regarding visibility at one or more stationary positions based on the location from one or more remote devices (e.g., sensing apparatuses 60 corresponding with the location (e.g., within a region that includes the location or outside a region corresponding with the location). The sensing apparatuses 60 may be or comprise weather stations, image sensors and/or the like. The computing entity 10 may receive and analyze the information regarding visibility obtained from the plurality of sensing apparatuses 60. The computing entity 10 may determine a reduced visibility event warning confidence based at least in part on the information regarding visibility. The information regarding visibility may comprise images and/or sensor information/data (e.g., temperature, atmospheric pressure, pressure, humidity, wind speed and/or direction, precipitation amounts, UV radiation, solar radiation). The computing entity 10 may transmit an indication (e.g., a signal or message) over the network 50 to one or more vehicle apparatuses 20 based on the determined reduced visibility event warning confidence. For example, the computing entity 10 may transmit an indication to one or more vehicle apparatuses 20 to cause publication of the reduced visibility event warning or cause deactivation of the reduced visibility event warning based on the reduced visibility event warning confidence. Causing publication of the reduced visibility event warning may comprise transmitting an indication to one or more remote devices/vehicle apparatuses 20 for presentation (e.g., display) in conjunction with a mapping or navigation system.

FIG. 3 provides a flowchart of operations 300 performed by the vehicle apparatus 20, according to example embodiments.

Beginning at block 301, the vehicle apparatus 20 includes means, such as a processor 22, for generating a reduced visibility event warning based on vehicle sensor information/data. The vehicle apparatus 20 generates a reduced visibility event warning based on sensor information/data that satisfies a plurality of conditions. For example, a vehicle apparatus 20 may generate a reduced visibility event warning when the vehicle speed is below a threshold, rear fog lights and/or low beam lights are activated and/or windshield wipers are manually or automatically activated. The vehicle speed threshold may be absolute or relative (e.g., 60 miles per hour or more than 5 miles below the speed limit at the vehicle's location). The reduced visibility event warnings are generated based on vehicle sensor information/data transmitted from one or more vehicle apparatuses 20. In some embodiments, the reduced visibility event warning may be transmitted from a separate remote device that aggregates data/information (e.g., a plurality of reduced visibility event warnings) from a plurality of vehicle apparatuses 20. In other embodiments, the computing entity 10, such as the processor 12, may generate the reduced visibility event warning based on vehicle sensor information/data received from the plurality of vehicle apparatuses 20.

At block 303, the vehicle apparatus 20 includes means, such as the processor 22, the communication interface 26 or the like, for transmitting an indication of the reduced visibility event warning over the network 50 to the computing entity 10. The indication of the reduced visibility event warning may comprise data such as a message or a data object that describes the reduced visibility event warning. In some embodiments, the vehicle apparatus 20 includes means, such as the processor 22, for transmitting vehicle sensor information/data to a remote computing device that aggregates data/information from a plurality of vehicle apparatuses 20. In such embodiments, the remote computing device may be configured to generate the reduced visibility event warning based on the vehicle sensor information/data and transmit the indication of the reduced visibility event to the computing entity 10.

FIG. 4 provides a flowchart of operations 400 performed by the computing entity 10 to determine a reduced visibility event warning confidence, according to example embodiments.

Starting at block 401, the computing entity 10 includes means, such as the processor 12, the communication interface 16 or the like, for receiving an indication of a reduced visibility event warning over the network 50.

At block 403, the computing entity 10 includes means, such as the processor 12, for identifying (e.g., determining) a location corresponding with the reduced visibility event warning. In some embodiments, the location may correspond with a plurality of reduced visibility event warnings received concurrently or consecutively from a plurality of vehicle apparatuses 20. The location may be or comprise one or more points, lines (e.g., roads) or regions (e.g., polygons) corresponding with a geographical location on a map at which the one or more reduced visibility event warnings was generated and with which the one or more reduced visibility event warnings are otherwise associated. In one embodiment, a database 40 may store definitions of a plurality of regions bounded by respective polygons. An example polygon may bound a region that comprises multiple roads within a corresponding portion of the map. Identifying the location may comprise generating a polygon including the location from which the one or more reduced visibility event warnings originated, such as by reference to the database 40.

In various embodiments, the computing entity 10, such as the processor 12, may identify (e.g., determine) a geographical region, e.g., country, state, city, etc., corresponding with the location such as a geographical region that includes the location. Determining the geographical region may comprise map matching the origination points corresponding with the one or more reduced visibility event warnings using a point-based map matcher or reverse geocoding the vertices of a polygon to determine a semantic address. In some embodiments, if the computing entity 10, such as the processor 12, determines that the location is within a predefined geographical region, such as a geographical region having historically low numbers of false positive reduced visibility event warnings, such as having less than a predefined percentage of the total reduced visibility event warnings being identified to be false positive reduced visibility event warnings (e.g., a geographical region in which driving regulations relating to reduced visibility conditions are well established and complied with), the operations 400 may terminate. Otherwise, the computing entity 10 may proceed with the operations 400.

FIG. 5 is a flowchart illustrating operations performed by a sensing apparatus 60, such as by an image apparatus/sensor (e.g., traffic camera with computer vision and/or image recognition capabilities) or weather station, in accordance with an example embodiment. An embodiment of the sensing apparatus 60 may also be represented by FIG. 2B.

At block 501, the sensing apparatus 60 includes means, such as a processor 12, a communications interface 16 or the like, for receiving a request for information regarding visibility at one or more positions, such as one or more stationary positions, based on the location. The information regarding visibility may comprise image data, visibility data, environmental data, combinations thereof and/or the like.

At block 503, the sensing apparatus 60 includes means, such as the processor 12, the communications interface 16 or the like, for transmitting the information regarding visibility. In various embodiments, the sensing apparatus 60 may be within a region corresponding with the location, while in other embodiments, the sensing apparatus 60 is outside the region corresponding with the location. In some embodiments, such as in instances in which the sensing apparatus 60 is embodied by a traffic camera, the sensing apparatus 60 may transmit images to the computing entity 10. In other embodiments, such as in instances in which the sensing apparatus 60 is a weather station, the visibility data may comprise a visibility measurement indicating the distance at which an object can be clearly discerned (e.g., 16.09 km or 10 miles).

Returning to FIG. 4, at block 405, the computing entity 10 includes means, such as the processor 12, the communications interface 16 or the like, for obtaining (receiving) information regarding visibility from one or more sensing apparatuses 60 or remote devices. For example, the computing entity 10 may comprise means, such as a processor 12, the communication interface 16 and/or the like, for instructing the sensing apparatus 60 to provide information regarding visibility, such as sensor data/information from the location or from a region including the location (e.g., from one or more sensing apparatuses 60 positioned within a region that includes the location). In some embodiments, such as in embodiments in which there is no sensing apparatus 60 within the region that includes the location, the information regarding visibility may be interpolated from sensor data/information provided by two or more sensing apparatuses outside of the region, such as the two or more weather stations outside of the region, but closest to the location. The interpolation may be performed by the computing entity 10, such as the processor 12, or by one or more of the sensing apparatuses 60, such as the processor 12. In an example embodiment, the computing entity 10 may interpolate information regarding visibility for the location from two or more sensing apparatuses 60 outside a region that includes the location (e.g., obtain information from nearest weather stations outside a region that includes the location). For example, the computing entity 10 may perform the interpolation using distance-based or distance-time based interpolation techniques (e.g., from the closest sensing apparatuses 60 within a predetermined distance threshold to the location). In some embodiments, data may be requested from and transmitted by other remote computing devices, processors and/or the like. For example, images may be transmitted from a sensing apparatus 60 (e.g., traffic camera, weather station, image apparatus) located within a region that includes the location in addition to or instead of obtaining information regarding visibility from one or more weather stations, such as in an instance in which there is no weather station within the region that includes the location at which the reduced visibility warning was issued. The sensing apparatus 60 may comprise means, such as the processor 12, communications interface 16, and/or the like, for transferring data to and receiving data from the computing entity 10.

Determining a Reduced Visibility Event Warning Confidence

At block 407, upon receipt of the information regarding visibility, the computing entity 10 may comprise means, such as processor 12 and/or the like, for determining (e.g., confirming) whether the received information indicates reduced visibility at the location. For example, the computing entity 10 determines a reduced visibility event warning confidence based at least in part on the information regarding visibility provided by the one or more sensing apparatuses 60. At least a portion of the received information (e.g., sensor data) may be analyzed by the computing entity 10 to determine a reduced visibility event warning confidence for the location based upon the information. For example, the computing entity 10 may be configured to receive and analyze sensor data from one or more sensing apparatuses 60. In this regard, the computing entity 10 may comprise means, such as processor 12, communications interface 16, and/or the like, for receiving and analyzing the received information. For example, the processor may be configured to process the received information, such as by computer-executable instructions that indicate which sensor information/data is to be used in the analysis, provide one or more algorithms or functions for performing the analysis, provide one or more coefficients and/or parameters to be used in accordance with an algorithm for performing the analysis, provide one or more guidelines for providing a response indicating a result of the analysis, and/or the like. In example embodiments, the computer-executable instructions may be configured in accordance with a standardized computer programming language, standardized vehicle language, coded for a standardized sensor access library, provided in a map provider language and configured to be translated from the map provider language into a common vehicle language or a vehicle specific language (e.g., by a translation module or other portion of the map), and/or the like. In an example embodiment, the computer-executable instructions may comprise a reference to a function repository and/or one or more coefficients and/or parameters to be used in the calculation or determination of the result of the referenced instructions, function, or algorithm.

The reduced visibility event warning confidence may be a score or a probability that a reduced visibility event warning corresponds with a reduced visibility condition at a location. The reduced visibility event warning confidence may be an aggregate or sum of a first confidence value (e.g., percentage) corresponding with the reduced visibility event warning and a second confidence value (e.g., percentage) corresponding with the information regarding visibility. The computing entity 10 may determine the reduced visibility event warning confidence based on the following equation:

$$C = (a*C_i) + (b*C_v) \qquad \text{Equation 1}$$

In the above formula, "C" is a reduced visibility event warning confidence; "$C_i$" is a first confidence value corresponding with the reduced visibility event warning; "$C_v$" is a second confidence value corresponding with the received information regarding visibility; "a" is a weight/percentage corresponding with the first confidence value, "$C_i$," and "b" is a weight/percentage corresponding with the second confidence value "$C_v$."

In various embodiments, the computing entity 10, such as the processor 12, may assign equal weights/percentages for the first confidence value, "$C_i$," and the second confidence value, "$C_v$," (e.g., "a" is 50% and "b" is 50%). In other embodiments, the computing entity 10 may assign different weights/percentages "$C_i$" or "$C_v$", (e.g., "a" is 50% and "b" is 25%).

In various embodiments, the computing entity 10 may assign a default confidence value for the first confidence value "$C_i$," corresponding with the received reduced visibility event warning. For example, if the first confidence value "$C_i$," is "1," and the weight/percentage, "a," is assigned 50%, then the first confidence value corresponding with a reduced visibility event warning, "$C_i$"=1*50% (which is 50%).

The computing entity 10 may use various methods to determine the second confidence value corresponding with the received information regarding visibility, "$C_v$." The second confidence, "$C_v$," may be a confidence value corresponding with information regarding visibility received from one or more sensing apparatuses 60 (e.g., weather stations, image sensors/apparatuses, combinations thereof and/or the like). In this regard, the information regarding visibility may be that information collected or reported within a window of time that includes the time at which the reduced visibility warning was generated or that information collected or reported at a time that is closest to the time at which the reduced visibility warning was generated. If the information regarding visibility comprises a visibility measurement, the computing entity 10 may determine "$C_v$" based on the percentage of sensing apparatuses 60 within the region that includes the location associated with the reduced visibility warning reporting a visibility measurement that satisfies a predetermined threshold, such as by being below a predetermined threshold (e.g., 16.09 km or 10 miles) so as to validate the reduced visibility warning. The computing entity 10 may increase, lower or maintain the second confidence value, "$C_v$," in proportion to the received information regarding visibility (e.g., the number of sensing apparatuses 60 within the region reporting information indicating a reduced visibility condition at the location out of a total number of sensing apparatuses 60 within the region that provide information regarding the location). If a majority of sensing apparatuses 60 report information indicating reduced visibility, the computing entity 10 may increase the second confidence value corresponding with the information regarding visibility, "$C_v$". If few or no sensing apparatuses 60 report information indicating reduced visibility, such as a minority of the sensing apparatuses, the computing entity may decrease the second confidence value corresponding with the information regarding visibility, "$C_v$".

In an example embodiment, the sensing apparatuses 60 may comprise weather stations. If a weather station reports a visibility measurement below a predetermined threshold (e.g., 16.09 km or 10 miles), the computing entity 10 may determine that the received information from the weather station indicates a reduced visibility at the location. Therefore, the computing entity 10 may determine the second confidence value, "$C_v$," based on the number of sensing apparatuses 60 (e.g., weather stations) corresponding with the location that provide (e.g., report, transmit, send) information indicating reduced visibility at the location. The computing entity 10 may determine the second confidence value, "$C_v$," using the following formula:

$$C_v = \frac{M}{N} \quad \text{Equation 2}$$

In the above equation, "M" is the number of sensing apparatuses 60 that provide information indicating a reduced visibility condition at the location; and "N" is the total number of sensing apparatuses 60 corresponding with the location.

Combining Equations 1 and 2 above, the reduced visibility event warning confidence may be defined as, $$C = (a * C_i) + \left(b * \frac{M}{N}\right).$$

For example, if 10 of a total of 20 weather stations provide information indicating a reduced visibility condition at the location ("M" is 10 and "N" is 20) and "a" is 50%, "b" is 25%, and "$C_i$" is a default value 1, the reduced visibility event warning confidence, "C," is calculated as follows:

$$C = (50\% * 1) + \left(25\% * \frac{10}{20}\right) = 62.5\%.$$

In an example embodiment, in an instance in which there are no weather stations within the region corresponding with the location, and the computing entity 10 interpolates information regarding visibility from weather stations positioned outside the region corresponding with the location of the reduced visibility event warning, if all of the weather stations closest to the region are indicative of reduced visibility within the region, then "M/N" is 1. However, if none of the weather stations closest to the region are indicative of reduced visibility within the region, then "M/N" is 0.

In some embodiments, the information regarding visibility may also or alternatively comprise images received from one or more sensing apparatuses 60. The computing entity 10 may receive and analyze a plurality of images. Of the plurality of images that are received, the computing entity 10, such as the processor 12, may be configured to discard one or more images for failing to meet one or more conditions. For example, unclear images may be discarded.

In such embodiments, the computing entity 10 may determine the second confidence value, "$C_v$," based on the images received from sensing apparatuses 60 that provide information indicating a reduced visibility condition at the location. The computing entity 10, such as the processor 12, may receive an image as input and output a determination as to whether the image contains evidence of a reduced visibility condition at the location. The computing entity 10, such as the processor 12, may be configured to classify or tag the images by assigning a certainty score to each image (for example, image 1—"visibility reduced"—98% certainty). Images below a set threshold of certainty may be discarded or a weight factor may be applied such that images classified above a given percentage of certainty are given more weight in the analysis. The image analysis may be manual, e.g. the images may be presented to humans interfacing with the system who assign tags and/or scores to each image. Alternatively, the analysis may be pursuant to an automated image analysis technique implemented by the processor 12 or other computing device. For example, a machine learning model utilizing computer vision algorithm(s) (e.g. convolutional neural network) may be utilized by the processor 12 or other computing device to classify/tag the images. An image indicating reduced visibility may show fog, smoke, mist and/or the like, such as raindrops on the lens of the camera that captured the image. An image not indicating reduced visibility may show clear and dry conditions. In some embodiments, the information regarding visibility (e.g., images) may be analyzed by a different remote computing entity and then transmitted to the computing entity 10 for further operations.

In some embodiments, the computing entity 10 may categorize each sensing apparatus 60 as reporting "visibility reduced," or "visibility not reduced" based on a ratio of images indicating a reduced visibility condition to the total number of images received from the sensing apparatus 60. For example, a sensing apparatus 60 may be determined to report "visibility reduced" in an instance in which a majority or at least a predefined percentage of the images in a window of time that includes the time at which the reduced visibility warning was issued are classified to indicate reduced visibility, or in which the image that was captured closest in time to the time at which the reduced visibility warning was issued was classified to indicate reduced visibility. Alternatively, a sensing apparatus 60 may be determined to report "visibility not reduced" in an instance in which a minority or less than a predefined percentage of the images in a window of time that includes the time at which the reduced visibility warning was issued are classified to indicate reduced visibility, or in which the image that was captured closest in time to the time at which the reduced visibility warning was issued was not classified to indicate reduced visibility.

The computing entity 10, such as the processor 12, may be configured to set other conditions as part of the analysis, for example, requiring a specified 'total number of images' to be analyzed or a certain number of unique sources and/or combinations of sources (e.g. two or more sensing apparatuses 60 reporting) with these other conditions needing to be satisfied prior to determining the reduced visibility event warning confidence. The computing entity 10, such as the processor 12, may utilize other methodologies, conditions and formulas. Referring to Equation 2 above, if the number of sensing apparatuses 60, "M," within the region that provide images that are categorized as "visibility reduced," (i.e., provide images indicating a reduced visibility condition) represent a majority of a total number of sensing apparatuses 60, "N," in the region that provide images (regardless of the categorization of the images), then the second confidence value corresponding with information regarding visibility, "$C_v$," will be high. If a number of sensing apparatuses 60 in region that are, instead, categorized as "visibility not reduced" are a majority of a total number of sensing apparatuses 60, "N," in the region, then the second confidence value corresponding with information regarding visibility, "$C_v$," will be low. If no sensing apparatuses 60 can be categorized as "visibility reduced" or if the information provided is inconclusive, "$C_v$," may be 0.

At block 409, the computing entity 10 is shown to include means, such as the processor 12, the memory 14 or the like, for setting a reduced visibility event warning confidence threshold for publishing a reduced visibility event warning. For example, the computing entity 10, such as the processor 12, may set a reduced visibility event warning confidence threshold of 74% and, as a result, require a reduced visibility event warning confidence that satisfies the threshold, such as by equaling or exceeding the threshold, e.g., 74%, in order to publish the reduced visibility event warning for the location. The confidence threshold may be a predetermined or configurable parameter.

Referring to Equation 1 above, the computing entity 10, such as the processor 12, may assign a default confidence value for the first confidence value corresponding with the reduced visibility event warning, "$C_i$," (and weight) that is lower than the confidence threshold such that no reduced visibility event event warning is publishable without some confirmation based on information provided by a sensing apparatus 60, such as in the form of a second confidence value, "$C_v$,". For instance, if the confidence threshold is 74% and the computing entity 10, such as the processor 12, assigns a default first confidence value and corresponding weight of 50% (e.g., a is 50% and $C_i$ is 1), the reduced visibility event warning will not be published unless the second confidence value and corresponding weight ($b*C_v$) is at least 24%.

In an example, if the sensing apparatuses 60 comprise weather stations and all weather stations, "M," (e.g., 10 out of a total of 10 weather stations) corresponding with the location of the reduced visibility event warning are categorized as "visibility reduced" (i.e., provide information indicating a reduced visibility condition at the location), then applying Equation 2:

$$C_v = \frac{10}{10} = 1$$

If the confidence threshold is 75%, "a" is 50%, "b" is 25%, and "$C_i$" is 1, then, when combined with Equation 1 above:

$$C = (50\% * 1) + \left(25\% * \frac{10}{10}\right) = 75\%$$

In the above example, since the confidence "C" meets the confidence threshold of 75% and the reduced visibility event warning will be published.

In another example, if the sensing apparatuses 60 comprise weather stations and 50% of the weather stations, "M," (e.g., 5 out of a total of 10 weather stations) corresponding with the location of the reduced visibility event warning are categorized as "visibility reduced" (i.e., provide information indicating a reduced visibility condition at the location), then applying Equation 2:

$$C_v = \frac{5}{10} = 0.5$$

Assuming the same conditions in the example above and applying Equation 1:

$$C = (50\% * 1) + \left(25\% * \frac{5}{10}\right) = 62.5\%.$$

In this example, since "C" does not meet the confidence threshold of 75%, the reduced visibility event warning is not published.

Although the examples above are each described in relation to one type of sensing apparatus 60, in some embodiments, the computing entity 10, such as the processor 12, may aggregate confidence values for different types of sensing apparatuses 60 to determine the second confidence value corresponding with the received information regarding visibility, "$C_v$." For example, the computing entity 10 may determine the second confidence value, "$C_v$," and corresponding weight, "b" using the following formula:

$$b*C_v = b_1*C_{weather\ stations} + b_2*C_{image\ sensors} \ldots b_x \qquad \text{Equation 3}$$

In the above equation, "$C_{weather\ stations}$" is a confidence value based on information regarding visibility received from weather stations; "$C_{image\ sensors}$" is a confidence value based on information regarding visibility received from image sensors; "$C_x$" is a confidence value based on information provided by another type of sensor (if any); "$a_1$" is a weight corresponding with "$C_{weather\ stations}$"; "$a_2$" is a weight corresponding with "$C_{image\ sensors}$" and "$b_x$" is a weight corresponding to "$C_x$".

$C_{weather\ stations}$ is determined based on the ratio of weather stations associated with the location of the reduced visibility event warning categorized as "visibility reduced" to a total number of weather stations in a region corresponding with the location and $C_{image\ sensors}$ is determined based on the ratio of image sensors categorized as "visibility reduced" associated with the location of the reduced visibility event warning to a total number of image sensors in a region corresponding with the location.

In an example, where "$b_1$" is 25%, "$b_2$" is 12.5%; 6 of 10 image apparatuses are categorized and "visibility reduced", and 3 of 5 weather stations are categorized as "visibility reduced", then applying Equation 3:

$$b*C_v = \left(25\% * \frac{6}{10}\right) + \left(12.5\% * \frac{3}{5}\right) = 22.5\%.$$

When combined with Equation 1, above, if "a" is 50%, and "$C_i$" is 1, then:

$$C = (50\%*1) + 22.5\% = 72.5\%.$$

As "C" is less than the threshold, the reduced visibility event warning is not published. In another example, where "$b_1$" is 25% and "$b_2$" is 25%, either $C_{weather\ stations}$ must be a maximum value (i.e., fully confirmed by all weather stations) if $C_{image\ sensors}$ is 0, $C_{image\ sensors}$ must be a maximum value if $C_{weather\ stations}$ is 0, or both $C_{weather\ stations}$ and $C_{image\ sensors}$ must be non-zero values (i.e., partially confirmed by a combination of weather stations and image sensors) in order for the reduced visibility event warning to be published. In some embodiments, the computing entity 10, such as the processor 12, may adjust the weights for each type of sensing apparatus 60 based on resource availability. For instance, if there are more image sensors than weather stations corresponding with a location, the computing entity 10 may increase the weight corresponding with the image sensor confidence value and decrease the weight corresponding with the weather station confidence value.

As described above, the computing entity 10 may be configured to analyze the received information regarding visibility to determine a reduced visibility event warning confidence. In other embodiments, however the information regarding visibility may be analyzed by the vehicle apparatus 20 and/or other remote or computing entities and then transmitted to the computing entity 10 only after the reduced visibility event warning confidence has been determined.

Returning to block 409, if the computing entity 10, such as the processor 12, determines that the the reduced visibility event warning confidence, "C" is above the confidence threshold, the process continues to block 411 and the computing entity 10 includes means, such as the processor 12, the communication interface 16 or the like, for causing the reduced visibility event warning to be published (e.g., transmits computer-executable instructions). Publication of the reduced visibility event warning may have any of various forms and, in one embodiment, may comprise a message or indication transmitted to the vehicle apparatus(es) 20 or provided in conjunction with the navigation or mapping system. In some embodiments, the computing entity 10, such as the processor 12, may provide instructions or other information causing a stored reduced visibility event warning to be provided, such as by causing stored computer instructions to be executed to generate the warning. An updated map may be provided or transmitted to the one or more vehicle apparatuses 20. For example, the computing entity 10 may comprise means, such as the processor 12, communications interface 16, and/or the like, for providing the updated map. For example, the updated map may be provided and/or transmitted to a plurality of vehicle apparatuses 20 via the network 50. Based upon the updated map and the indication associated with a location corresponding with a reduced visibility condition, a reduced visibility event warning may be presented to the driver of the vehicle, such as by the display associated with a navigation or mapping system in which a reference to reduced visibility is associated with the location on the map, audibly via a vehicle entertainment system or the like. Once the computing entity 10 has provided the instructions regarding a reduced visibility event warning, the reduced visibility event warning may be presented to the vehicle and/or the driver of the vehicle in all instances in some embodiments. Alternatively, the reduced visibility event warning may only be presented to the vehicle and/or the driver of the vehicle in an instance in which the vehicle is proximate the location, such as within a predefined distance of the location, and/or in an instance in which the predefined route along which the vehicle is travelling passes within a predefined distance of the location.

Referring to FIG. 3, at block 305, the vehicle apparatus 20 includes means, such as the processor 22, the communication interface 26 or the like, for receiving the instructions or other information regarding the reduced visibility event warning and, in some embodiments, the location associated with the reduced visibility event warning from the computing entity 10. If the computing entity 10 determined that the reduced visibility event warning confidence is above the confidence threshold, the vehicle apparatus receives instructions to publish the reduced visibility event warning at block 307.

Alternatively, returning to FIG. 4, if the computing entity 10, such as the processor 12, determines at block 409 that the reduced visibility event warning confidence, "C" is below the confidence threshold, the process continues to block 413 and the computing entity 10 includes means, such as the processor 12, the communication interface 16 or the like, for causing deactivation of the reduced visibility event warning, such as by transmitting instructions to deactivate.

Then, returning to FIG. 3, the vehicle apparatus 20 includes means, such as the processor 22, the communication interface 26 or the like, for receiving the instructions and at block 309, deactivating the reduced visibility event warning.

Vehicle Apparatus Operation

As discussed above, FIG. 3 provides a flowchart of operations performed by a vehicle apparatus 20 in communication with the computing entity 10. The vehicle apparatus 20 may be configured to transmit and/or receive information from the computing entity 10, such as by receiving instructions from the computing entity 10. The vehicle apparatus 20 may be configured to utilize or subscribe to a system or application (e.g., a mapping system, navigation system or weather alert system) provided by or otherwise supported by the computing entity 10. The example mapping system may comprise computer-executable instructions embedded therein. When the vehicle apparatus 20, on-board a vehicle, traverses within the specified range of a location corresponding with a reduced visibility condition, computer-executable instructions embedded in the map may be executed to cause publication of the reduced visibility event warning.

The vehicle apparatus 20 may include means, such as the processor 22, for initializing the mapping system or navigation system (e.g. a user may launch an application on a computing device comprising an interactive map). The interactive map, or portions thereof, may be received (e.g. from the computing entity which may, in some embodiments be remote from the vehicle apparatus 20) and stored by the vehicle apparatus 20, such as in memory 24. In some embodiments, the computing entity 10 may transmit instructions for updating a copy of the interactive map stored by the vehicle apparatus 20. The interactive map may comprise computer-executable instructions embedded therein. For example, the vehicle apparatus 20 may comprise means, such as processor 22, memory 24, communications interface 26, and/or the like, for receiving, storing and/or updating the interactive map.

In various embodiments, the vehicle apparatus 20 may be determined to be within a specified range of a location corresponding with a reduced visibility event warning associated with one or more geographical points, lines or areas, e.g., polygons, of the map. The vehicle apparatus 20 may be, for example, following a route or a predicted route that passes within the specified range of the location corresponding with the reduced visibility event warning represented by one or more geographical points, lines or areas on the map.

In some embodiments, the computer-executable instructions may comprise a reference to a function repository stored in association with the map. For example, the function repository may be a reference table, a serialized file, a database, and/or the like. In example embodiments, the computer-executable instructions may comprise a reference to a function repository stored in the association with the map and one or more coefficients or parameters that are to be used in the calculation or determination of the result of the referenced instructions, function(s), or algorithm(s). In such an embodiment, the referenced instructions, function(s), and/or algorithm(s) may be retrieved and/or accessed from the function repository. For example, the vehicle apparatus 20 may be configured to retrieve and/or access instructions, function(s), and/or algorithm(s) referenced by the computer-executable instructions embedded in the map, from the function repository. For example, the vehicle apparatus 20 may comprise means, such as processor 22, memory 24, and/or the like, for retrieving and/or accessing instructions, function(s), and/or algorithm(s) referenced by the computer-executable instructions, such as the instructions embedded in the map, e.g., a link data record of the map, from the function repository. In some embodiments, the function repository may comprise different instructions based on different road design rules for different countries or geographical or political regions and/or the conventions thereof. In further embodiments, the function repository may consist of different instructions based on the type of vehicle being driven, the time of day, current velocity, and/or the like.

In some example embodiments, the vehicle apparatus 20 may comprise factory programmed instructions, function(s), algorithm(s), and/or the like (e.g., stored in memory 24) that may be defined for global usage (e.g., not defined to be unique with respect to a particular road segment or link) and the embedded computer-executable instructions may comprise one or more coefficients or parameters that are to be used in the calculation or determination of the result of the factory programmed instructions, function(s), or algorithm(s). For example, the factory programmed instructions, function(s), or algorithm(s) may comprise use of sensor information/data collected, captured, gathered, measured, and/or the like by a first sensor of the one or more sensors 30. The embedded computer-executable instructions may cause the vehicle apparatus 20, such as the processor 22, to analyze the sensor information/data differently along a respective portion of the map than is provided for by the factory programmed instructions, function(s), or algorithm(s).

The vehicle apparatus 20 may be configured to transmit a response that includes or is otherwise based on the sensor data. The computer-executable instructions may be executed by the processor 22 to cause analysis of at least a portion of the sensor information/data collected, captured, gathered, measured, and/or the like by the one or more sensors 30 as the vehicle traversed the road segment that passes within a specified range of a location corresponding with a reduced visibility event warning and transmission of a response. A response may be transmitted via the network 50, such as to the computing entity 10. For example, the vehicle apparatus 20 may comprise means, such as the processor 22, communications interface 26, and/or the like, for providing a response including, in some embodiments, the sensor data and location data indicating the location at which the sensor data was collection (and, in some instances) a time stamp indicating the time at which the sensor data was collected. In example embodiments, the computing entity 10 may be configured to receive the response from the vehicle apparatus 20. In example embodiments, a response may comprise the sensor data and/or an indication of a result of the analysis of sensor information/data that was caused by execution of the computer-executable instructions embedded in the map corresponding to the particular portion of the map (e.g. location corresponding with reduced visibility event warning).

Additionally, a response may comprise vehicle identification information/data. For example, a response may indicate the type, make, model, trim package, year and/or the like of the vehicle associated with the vehicle apparatus 20, a sensor configuration associated with the vehicle apparatus 20, and/or the like. In some embodiments, the computing entity 10, such as the processor 12 may determine and execute computer-executable instructions that are adapted to analyze the sensor data in a manner that is tailored for a particular type, make, model, trim package, year and/or the like of vehicle or a particular type of sensor configuration associated with the vehicle apparatus 20. As should be understood, in various embodiments, the response may comprise various information/data identifying the vehicle apparatus 20 and/or the corresponding vehicle such that, if desired, the computer-executable instructions assigned to particular portions of the map may be adapted or optimized for a particular vehicle type, make, model, trim package, year, and/or the like and/or a particular sensor configuration associated with the vehicle apparatus 20.

In various embodiments, a response may comprise various other information/data associated with the vehicle; vehicle apparatus 20; the result of the analysis caused by the execution of the computer-executable instructions; the result of the analysis caused by factory programmed instructions, functions, or algorithms; and/or the like, as appropriate for the application.

The vehicle apparatus 20 may include means, such as the processor 22, the communications interface 26 or the like, for receiving a message to cause publication of a reduced visibility event warning, from the computing entity 10. In an example embodiment, the message may comprise an update to the interactive map/mapping system, a warning message/alert and/or the like. Based upon the message including, for example, an updated map, associated with a location, a reduced visibility event warning may be presented to the driver of the vehicle, such as by the display associated with a navigation or mapping system, audibly via a vehicle entertainment system or the like. Once the vehicle apparatus 20 has received the message to cause publication of a reduced visibility event warning, the reduced visibility event warning may be presented to the vehicle and/or the driver of the vehicle in all instances. Alternatively, the reduced visibility event warning may only be presented to the vehicle and/or the driver of the vehicle in an instance in which the vehicle is proximate the location, such as within a predefined distance of the location, and/or in an instance in which the predefined route along which the vehicle is travelling passes within a predefined distance of the location.

III. Example Apparatuses

The vehicle apparatus 20, sensing apparatus 60 and/or computing entity 10 of an example embodiment may be embodied by or associated with a variety of computing devices. The vehicle apparatus 20 may be embodied, for example, by a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. The computing entity 10 may be embodied in other types of computing devices, such as a server, a personal computer, a computer workstation, a laptop computer, a plurality of networked computing devices or the like, that are configured to identify a location corresponding with a reduced visibility event warning and to provide an indication in an instance in which a vehicle is near a location corresponding with a reduced visibility event warning or has a route that extends through the location.

In this regard, FIG. 2A depicts an computing entity 10 and FIG. 2B depicts a vehicle apparatus 20 or a sensing apparatus 60 of an example embodiment that may be embodied by various computing devices including those identified above. As shown, the computing entity 10 of an example embodiment may include, may be associated with or may otherwise be in communication with a processor 12 and a memory device 14 and optionally a communication interface 16 and/or a user interface 18. Similarly, a vehicle apparatus 20 or a sensing apparatus 60 of an example embodiment may include, may be associated with, or may otherwise be in communication with a processor 22, and a memory device 24, and optionally a communication interface 26, a user interface 28, and/or one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus 20 or sensing apparatus 60 to determine one or more features of the corresponding apparatus's surroundings).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the computing entity 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The computing entity 10, the vehicle apparatus 20 and/or the sensing apparatus 60 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface 16, 26 may include the circuitry for interacting with the antenna(s) to cause transmission of signals via the antenna(s) or to handle receipt of signals received via the antenna(s). In some environments, the communication interface 16, 26 may alternatively or also support wired communication. As such, for example, the communication interface may include a communication modem and/or other hardware/software for supporting communication via cable, digital subscriber line (DSL), universal serial bus (USB) or other mechanisms.

In addition to embodying the computing entity 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the data records (e.g., node data records, link data records, POI data records, and/or other data records) may comprise computer-executable instructions, a reference to an function repository that comprises computer-executable instructions, one or more coefficients and/or parameters to be used in accordance with an algorithm for performing the analysis, one or more response criteria for providing a response indicating a result of the analysis, and/or the like. In example embodiments, the vehicle apparatus 20 may be configured to execute computer-executable instructions provided by and/or referred to by a data record. In example embodiments, the computing entity 10 may be configured to modify, update, and/or the like one or more data records of the geographic database.

In an example embodiment, the data records represent and comprise road networks, roads, streets, paths and the like, such as used by vehicles, cars, and/or other entities. The roads, streets, and the like may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In example embodiments, the geographic database may be updated based on information/data provided by one or more vehicle apparatuses. For example, the computing entity 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3, 4 and 5 illustrate flowcharts of apparatuses 10, 20, 60 method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for determining a confidence associated with a reduced visibility event warning, the method comprising:
   receiving an indication of the reduced visibility event warning;
   identifying a location corresponding with the reduced visibility event warning;
   identifying a predefined geographical region associated with the location;
   responsive to determining an instance in which the predefined geographical region is associated with satisfaction of an above-threshold measure of false positive reduced visibility event warnings, obtaining, by a server, information regarding visibility at one or more stationary positions based upon the location of the reduced visibility event warning;
   determining a reduced visibility event warning confidence based at least in part on the information regarding visibility at the one or more stationary positions; and
   causing the reduced visibility event warning to be published based at least in part on the visibility event warning confidence.

2. The method of claim 1, wherein obtaining information regarding visibility at one or more stationary positions comprises obtaining information from one or more weather stations.

3. The method of claim 2, wherein obtaining information from one or more weather stations comprises obtaining information from one or more weather stations positioned within a region that includes the location.

4. The method of claim 2, wherein obtaining information from one or more weather stations comprises obtaining information from one or more weather stations positioned outside a region that includes the location and wherein the method further comprises:
   determining the visibility within the region based on the information provided by the one or more weather stations outside the region.

5. The method of claim 1, wherein obtaining information regarding visibility comprises obtaining one or more images from one or more image sensors within a region that includes the location.

6. The method of claim 1, further comprising:
   causing deactivation of the reduced visibility event warning in an instance in which the reduced visibility event warning confidence fails to satisfy a confidence threshold.

7. The method of claim 1, wherein causing the reduced visibility event warning to be published comprises causing the reduced visibility event warning to be transmitted for display in conjunction with a mapping or navigation system.

8. An apparatus configured to determine a confidence associated with a reduced visibility event warning, the apparatus comprising processing circuitry and at least one memory including computer program code instructions, the computer program code instructions configured to, when executed by the processing circuitry, cause the apparatus to:
   receive an indication of the reduced visibility event warning;
   identify a location corresponding with the reduced visibility event warning;
   identify a predefined geographical region associated with the location;
   in an instance in which the predefined geographical region is associated with satisfaction of an above-threshold measure of false positive reduced visibility event warnings, obtain information regarding visibility at one or more stationary positions based upon the location of the reduced visibility event warning;
   determine a reduced visibility event warning confidence based at least in part on the information regarding visibility at the one or more stationary positions; and
   cause the reduced visibility event warning to be published based at least in part on the visibility event warning confidence.

9. The apparatus according to claim 8, wherein the apparatus is caused to obtain information regarding visibility at one or more stationary positions by obtaining information from one or more weather stations.

10. The apparatus according to claim 9, wherein the information from the one or more weather stations comprises information from one or more weather stations positioned within a region that includes the location.

11. The apparatus according to claim 9, wherein the information from the one or more weather stations comprises information from one or more weather stations positioned outside a region that includes the location and wherein the computer program code instructions are further configured to, when executed by the processing circuitry, cause the apparatus to:
    determine the visibility within the region based on the information provided by the one or more weather stations outside the region.

12. The apparatus according to claim 8, wherein the apparatus is caused to obtain information regarding visibility by obtaining one or more images from one or more image sensors within a region that includes the location.

13. The apparatus according to claim 8, wherein the computer program code instructions are further configured to, when executed by the processing circuitry, cause the apparatus to:
    cause deactivation of the reduced visibility event warning in an instance in which the reduced visibility event warning confidence fails to satisfy a confidence threshold.

14. The apparatus according to claim 8, wherein the computer program code instructions are further configured to, when executed by the processing circuitry, cause the apparatus to cause the reduced visibility event warning to be published by causing the reduced visibility event warning to be transmitted to the one or more remote devices for display in conjunction with a mapping or navigation system.

15. A computer program product configured to determine a confidence associated with a reduced visibility event warning, the computer program product comprising at least one non-transitory computer-readable storage medium having computer executable program code instructions therein, the computer executable program code instructions comprising program code instructions configured, upon execution, to:

receive an indication of the reduced visibility event warning;

identify a location corresponding with the reduced visibility event warning;

identify a predefined geographical region associated with the location;

in an instance in which the predefined geographical region is associated with satisfaction of an above-threshold measure of false positive reduced visibility event warnings, obtain information regarding visibility at one or more stationary positions based upon the location of the reduced visibility event warning;

determine a reduced visibility event warning confidence based at least in part on the information regarding visibility at the one or more stationary positions; and cause the reduced visibility event warning to be published based at least in part on the visibility event warning confidence.

16. The computer program product according to claim 15, wherein the instructions configured to obtain information regarding visibility at one or more stationary positions comprise instructions configured to obtain information from one or more weather stations.

17. The computer program product according to claim 16, wherein the information from the one or more weather stations comprises information from one or more weather stations positioned within a region that includes the location.

18. The computer program product according to claim 16, wherein the instructions configured to obtain the information from the one or more weather stations comprise instructions configured to obtain information from one or more weather stations outside a region that includes the location and wherein the computer program code instructions further comprise program code instructions configured, upon execution, to:

determine the visibility within the region based on the information provided by the one or more weather stations outside the region.

19. The computer program product according to claim 15, wherein the instructions configured to obtain the information regarding the visibility comprise instructions configured to obtain one or more images from one or more image sensors positioned within a region that includes the location.

20. The computer program product according to claim 15, wherein the computer program code instructions further comprise program code instructions configured, upon execution, to:

cause deactivation of the reduced visibility event warning in an instance in which the reduced visibility event warning confidence fails to satisfy a confidence threshold.

* * * * *